United States Patent [19]

Willard

[11] 4,167,035
[45] Sep. 4, 1979

[54] VOLTAGE MULTIPLIERS

[75] Inventor: Gerald A. Willard, Carshalton, England

[73] Assignee: U.S. Philips Corporation, New York, N.Y.

[21] Appl. No.: 818,313

[22] Filed: Jul. 25, 1977

[30] Foreign Application Priority Data

Aug. 5, 1976 [GB] United Kingdom ............... 32679/76

[51] Int. Cl.² .............................................. H02M 7/00
[52] U.S. Cl. ........................................ 363/60; 363/68; 361/330
[58] Field of Search ............................ 363/59, 60–61, 363/67–68; 361/307, 310, 313, 323, 328, 330

[56] References Cited

U.S. PATENT DOCUMENTS

| 3,646,424 | 2/1972 | Dangschat | 363/59 X |
| 3,900,788 | 8/1975 | Behn et al. | 363/59 |
| 3,927,364 | 12/1975 | Bauer | 363/60 |

FOREIGN PATENT DOCUMENTS

| 7403572 | 6/1974 | Fed. Rep. of Germany | 363/59 |
| 2420452 | 11/1975 | Fed. Rep. of Germany | 363/60 |

*Primary Examiner*—William M. Shoop
*Assistant Examiner*—Peter S. Wong
*Attorney, Agent, or Firm*—Thomas A. Briody; William J. Streeter

[57] ABSTRACT

A voltage multiplier of the Cockroft-Walton type in which the ac—and dc—operated capacitors are arranged in respective separate capacitor winding rolls, the two rolls being arranged side by side on a common axis and the diodes being arranged between the two rolls.

8 Claims, 4 Drawing Figures

VOLTAGE MULTIPLIERS

This invention relates to a voltage multiplier comprising a plurality of series-connected diodes and a plurality of capacitors each connected across a respective pair of adjacent diodes. Such a multiplier is generally referred to as being of the Cockroft-Walton type since it was first described in "Experiments with high velocity positive ions—(1) Further developments in the method of obtaining high velocity positive ions." J. D. Cockroft and E. T. S. Walton, 'Proc. Roy. Soc.' (London) A. Volume 136, 1932 pages 619–630. The invention also relates to a method of manufacturing such a voltage multiplier.

Voltage multipliers of the type described are currently used, for example, to provide the "extra high tension" (EHT) supply for the final anode of the picture tube in a television receiver and, in some cases, also to provide a lower voltage for the so-called focussing anode of such tubes.

By virtue of the method of operation of this type of multiplier, the capacitors may be regarded as being divided into a first and a second group. The first group distributes the input voltage pulses to the capacitors of the second group which act as integrating, or storage, capacitors. The capacitors of the first group are therefore commonly referred to as a.c.-operated capacitors and those of the second group as d.c.-operated capacitors.

It is known from U.S. Pat. No. 3,927,364 to wind the capacitors of the two groups in respective roll windings and to locate these windings in a unit with their axes parallel. The diodes are then connected to lead-out wires emanating from the rolls.

The object of the present invention is the provision of a voltage multiplier of the type described which is cheaper to manufacture than the said known multiplier.

According to one aspect of the present invention, there is provided a voltage multiplier comprising a plurality of series-connected diodes and a plurality of capacitors each connected across a respective pair of adjacent diodes, the capacitors being arranged in separate capacitor winding rolls interconnected by said diodes, wherein the rolls are arranged side by side with their winding axes aligned and wherein the wire leads of the diodes serve as lead-out wires from the capacitor electrodes to the respective diodes.

By arranging the two winding rolls coaxially side-by-side, a compact unit is obtained and also the diode leads can be used as the lead-out wires from the electrodes thus eliminating the need for separate interconnecting leads.

In a preferred embodiment of the invention, the two capacitor winding rolls are arranged on a common former. This not only provides a rigid unit but also simplifies assembly of the multiplier.

According to a further aspect of the invention, there is provided a method of manufacturing a voltage multiplier of the type comprising a plurality of series-connected diodes and a plurality of capacitors each connected across a respective pair of adjacent diodes, the method comprising the steps of winding the capacitors in two winding rolls side-by-side on a common axis, and at appropriate respective points in the winding process, arranging each diode in turn so that each of its leads contacts a capacitor electrode in a respective one of the two groups.

By this method, the two groups are wound simultaneously in such a way that the diode leads are easily inserted in the windings at the appropriate points. This leads to a simplified manufacturing process. The diode leads may be flattened, e.g., by a pressing operation, in the region where they contact their respective capacitor electrodes in order to increase the contact area therebetween. Alternatively, a respective metal foil is first welded to each diode lead so that a large contact area is provided.

Preferably, a heat-shrinkable thermoplastic dielectric material is used in each capacitor group, the two groups being heat shrunk when the winding process is complete. This not only serves to stabilise the wound capacitors but also causes the diode leads to be firmly clamped between adjacent turns of the respective windings.

The two capacitor groups may be wound on respective formers but are preferably wound on a common former. The advantages accruing from the use of a common former are that the two winding groups are automatically aligned axially and there are fewer handling operations when setting up the winding machine.

An embodiment of the invention will now be described, by way of example, with reference to the accompanying drawings, of which:

Figure 1:
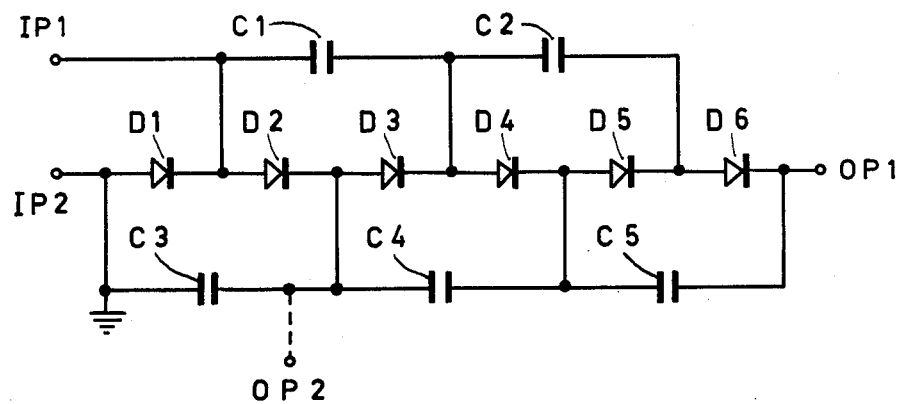
FIG. 1 shows a circuit diagram of a known Cockroft-Walton voltage tripler.

Referring now to FIG. 1 of the drawings, a known voltage tripler comprises six diodes D1 to D6 connected in series and five capacitors C1 to C5 arranged such that each capacitor is connected across a respective pair of adjacent diodes. A first input terminal IP1 is connected to the junction point of diodes D1, D2, and capacitor C1. A second input terminal IP2 is connected to the junction point of diode D1 and capacitor C3. A first output terminal OP1 is connected to the junction point of diode D6 and capacitor C5 and an optional second output terminal OP2 is connected to the junction point of diodes D2, D3 and capacitors C3, C4; the optional connection being shown by a broken line.

As can be seen from FIG. 1, the capacitors C1 to C5 are formed as a first group comprising series-arranged capacitors C1 and C2 and a second group comprising series-arranged capacitors C3, C4, C5.

It is assumed that, in operation of the multiplier, pulses appear on input terminal IP1 which are positive-going with respect to terminal IP2 which is shown as being grounded by way of example. If continuous positive-going pulses are applied to terminal IP1 the pulses having a peak voltage level of V with respect to terminal IP2, a voltage closely approaching V will be built up across capacitor C3 via diode D2. Thus, via diode D3, capacitor C1 tends to develop a voltage V across its terminals so that, in the absence of an input pulse on terminal IP1, the voltage at the junction point of capacitors C1 and C2 is approximately $+V$. When the voltage at terminal IP1 rises to $+V$ during each input pulse, the voltage at the junction point of capacitors C1 and C2 rises to approximately $+2\,V$ and this voltage causes capacitor C4 to charge via diode D4 until the voltage across its terminals is approximately equal to V. The voltage at the junction of capacitors C4 and C5 thus becomes substantially steady at a value of approximately +2 V with respect to the voltage (ground) on terminal IP2 and, via diode D5, the steady potential of V is built up across the terminals of capacitor C2. Each incoming pulse, as already explained, raises the potential at the C1–C2 junction to +2 V and, hence the potential at the D5–D6 junction is raised to approximately +3 V. As a result, capacitor C5 is charged via diode D6 so that the potential across its terminals builds up towards V. Since the voltage across each of capacitors C3, C4 and C5 builds up to an average d.c. value approaching V, the voltage at terminal OP1 approaches +3 V; i.e., three times the peak level V of the input pulses at terminal IP1. Due to various circuit losses and to the output current drawn via terminal OP1, of course, the voltage at terminal OP1 is less than three times the peak input voltage. The voltage +V appearing at terminal OP2 is frequently used to supply the lower voltage required for the focussing anode of some picture tubes.

From the foregoing operational description, it can be seen that capacitors C1 and C2 form a group of a.c.-operating (pulse-feeding) capacitors and capacitors C3, C4, and C5 form a group of d.c.-operating (storage) capacitors. The circuit shown in FIG. 1 may be converted to a voltage doubler by omitting components C2, C5, D5, and D6 and connecting terminal OP1 to the cathode of diode D4. In that case the group of a.c.-operating capacitors comprises solely the capacitor C1. Higher multiplication factors can be obtained by adding the appropriate number of stages; each stage being the same as that shown comprising components C2, C5, D5 and D6.

Figure 2:
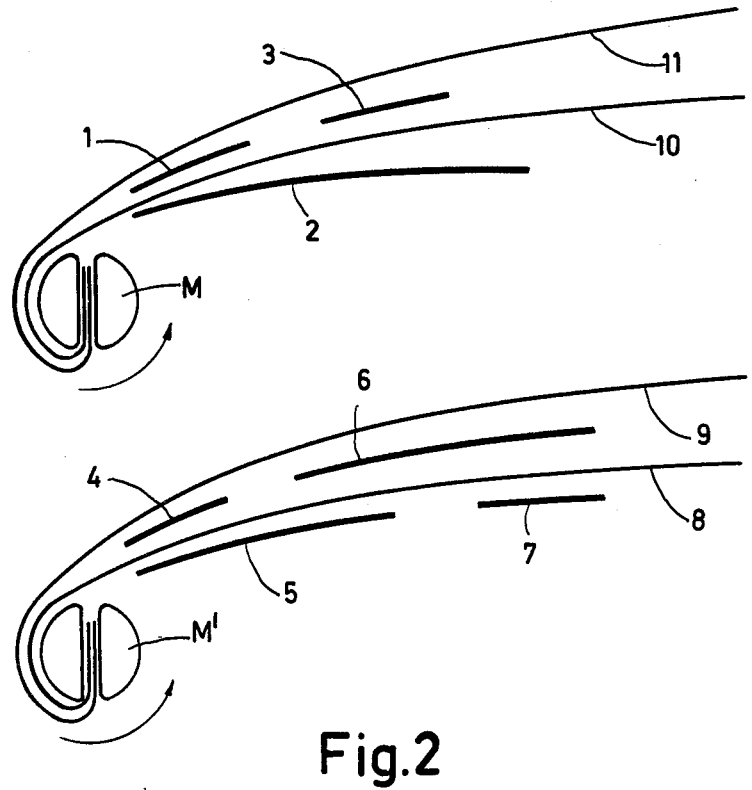
FIG. 2 illustrates the method of winding the capacitors of the tripler shown in FIG. 1.

According to the invention, the group of a.c.-operating capacitors C1 and C2 is wound as a first capacitor winding roll and the group of d.c.-operating capacitors C3, C4, and C5 is wound as a second capacitor winding roll; the two rolls being located with their axes aligned and the diodes being arranged between the two rolls. FIG. 2 shows, in schematic form how the two groups of capacitors are wound. The free ends of two continuous strips 10, 11 of dielectric film, fed from respective film reels not shown, are fed onto a winding mandrel M of a winding machine and anchored by, for example, a film-engaging slot. The free ends of two further continuous strips 8, 9 of dielectric film are similarly fed onto a winding mandrel M'.

Mandrels M and M' are arranged coaxially or may be portions of a single winding mandrel. The pairs of strips 8, 9 and 10, 11 are arranged side by side with sufficient space between them to accommodate the diodes D1 to D6 which are introduced during the subsequent winding operation. Mandrels M and M' are then rotated a few turns in the direction of the arrows to lock the strips onto the mandrels and to provide an insulating layer. The free end of a strip 1 of aluminium foil is fed into the roll between films 10 and 11 and the free end of a strip 2 of aluminium foil is fed into the roll below film 10. Similarly strips 4 and 5 of aluminium foil are fed into the other roll as shown in the Figure. The mandrels are then rotated until sufficient lengths of strips 1 and 4 have been wound on to their respective rolls to provide the capacitance between foil strips 1 and 2 and between foil strips 4 and 5 required for capacitors C1 and C3 respectively. Foil strips 1 and 4 are then torn or cut free from their respective supply reels and the mandrels are rotated again. A foil strip from the supply reel which originally supplied strip 4 is again fed into the winding roll, this time as foil strip 6. The mandrels are again rotated until there is sufficient overlap between foils 5 and 6 to provide the required capacitance value for capacitor C4. Foil 5 is then cut free from its supply reel and the mandrels are again rotated. The free ends of the foils from the supply reels which provided strips 1 and 5 are again introduced into the winding rolls, this time as foil strips 3 and 7 and the mandrels are again rotated until there is sufficient overlap between foils 2, 3 and 6, 7 to give required capacitance values for C2 and C5 respectively. Foils 2, 3, 6 and 7 are then cut free from their respective supply reels and the mandrels are again rotated a few times to provide a few outer turns of film on each winding roll. Film strips 8, 9, 10, 11 are then cut free from their supply reels and the outermost turn is then fixed in position, e.g. by an adhesive strip or by sealing it to itself by an adhesive or, preferably, by local heating.

During the winding of the two groups of capacitors, diodes D1 to D6 are inserted at the appropriate places, each diode having each of its two lead wires contacting a foil strip in a respective one of the two winding rolls. To increase the area of contact between each diode wire and its respective foil strip, the free end of the diode wire is flattened, by hammering or pressing, to form a spade terminal. Alternatively or additionally, small pieces of metal foil may be previously welded to the ends of the wires in order to increase the contact area. Lead-out wires for IP1, IP2, OP1, and OP2 are also provided during the winding process at the appropriate points.

Mandrels M and M' are preferably, but not necessarily, driven together. The use of separate drives for the two mandrels would enable an operator to progress each of the two winding rolls individually to a point where the appropriate electrode is exposed in each roll so that a diode can be laid between these two electrodes and held in place by the subsequent turns. This method uses the minimum amount of material but it has been found that it is preferable for mandrels M and M' to be driven together in accordance with a predetermined programme since the labour costs are reduced significantly whereas material costs are only marginally increased. Such a programme might, for example, start with operating instructions along the following lines:

1. Insert films 8, 9, 10, 11, in mandrel.
2. Rotate mandrels five turns.
3. Insert foils 4 and 5 on M.
4. Rotate half turn.
5. Locate lead-out wires against foils 4 and 5.
6. Rotate three turns.
7. Insert foils 1 and 2 on M'.
8. Rotate half turn.
9. Locate lead-out wire on foil 1 and diode D1 between foils 4 and 1.
10. Rotate half a turn.
11. Cut foil 4.
12. Rotate two turns . . . , etc.

Figure 3:
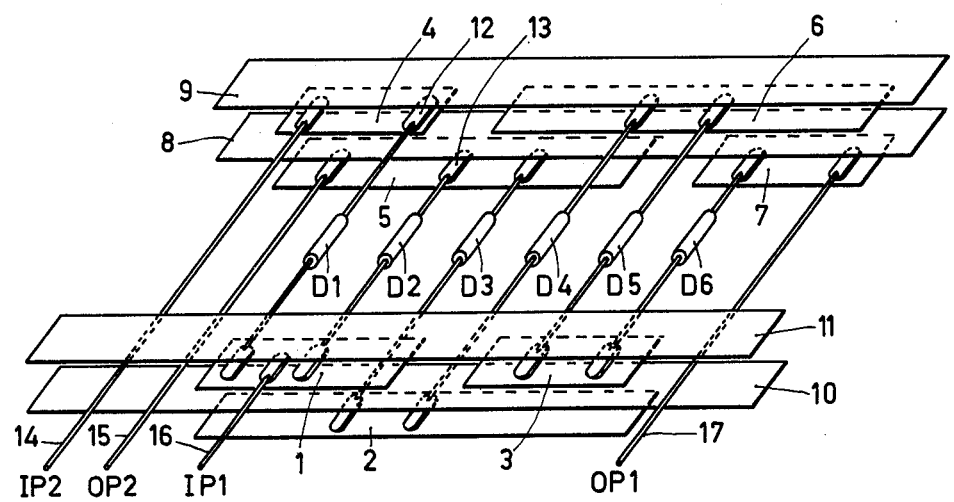
FIG. 3 illustrates, in exploded form, the mutual arrangement of the components of a voltage tripler according to the invention.

If the winding rolls of a complete unit formed in the above manner were unwound and the foil and film strips separated, the exploded view so given would be generally similar to that shown in FIG. 3 which is not to scale. In FIG. 3, the same references are used for components which are also shown in FIG. 1 and/or FIG. 2. The ends of the diodes and lead out wires are flattened in the manner shown at 12 and 13 to form spade-like contacts. Lead-outs 14, 15, 16 and 17 correspond to the leads to terminals IP2, OP2, IP1, and OP1, respectively, in FIG. 1. Capacitors C1, C2, C3, C4, C5, and C6 of FIG. 1 are formed in FIGS. 2 and 3 by the overlapping regions of the respective foil pairs 1,2; 2,3; 4,5; 5,6; and 6,7.

In FIGS. 2 and 3, the metal foils are shown separated by dielectric material represented by single film strips 8, 9, 10, and 11. In practise, each of these film strips is preferably a composite film comprising at least one polyester film and at least one polystyrene film. Such composite films are commonly used in capacitor manufacture and may comprise, for example, one or two polyester films between two polystyrene films or vice versa.

Preferably, at least one of the dielectric films is provided in the form of heat-shrinkable strip. When the winding process is completed and the unit has been removed from the winding machine, it is heated to the temperture at which the dielectric film shrinks due to previously-imposed stresses being relieved. This shrinkage causes the diode leads and the unit lead-out wires to be gripped very tightly between the winding layers; so providing good electrical contact between the wires and the foils and also a very high degree of mechanical rigidity to the unit. The whole unit may then be potted in an insulating material for example an epoxy resin.

The embodiment so far described has capacitor winding rolls of the "self-supporting," or "former-less," type. These rolls may, of course, be wound on a common former or on separate formers if required. If the formers are provided with flanges between the two winding rolls, slots would need to be provided in the flanges so that the rectifiers can be laid across the respective foils via these slots.

Figure 4:
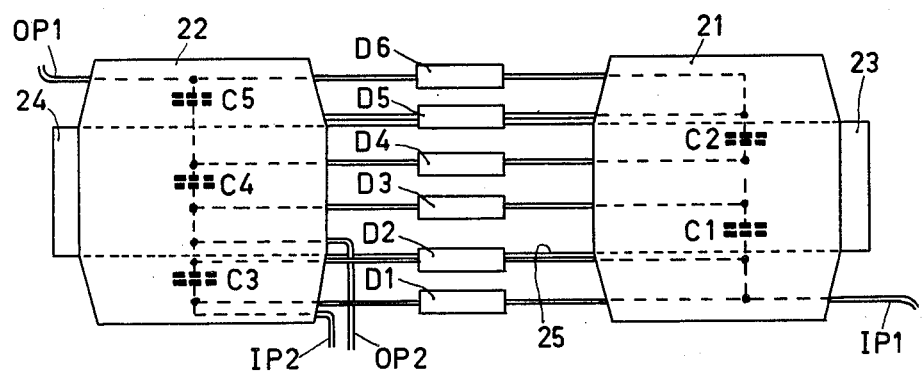
FIG. 4 shows a completed voltage tripler according to the invention.

FIG. 4 shows a voltage multiplier according to the invention having two capacitor winding rolls 21 and 22 arranged side by side on a common axis and with diodes D1 to D6 arranged between the two rolls. Roll 21 is assumed to contain capacitors C1 and C2, and roll 22 is assumed to contain capacitors C3, C4, and C5. Rolls 21 and 22 are shown wound on respective formers 23 and 24 forming part of a tubular member 25 and the electrical connections between the diodes and capacitors are shown in broken lines.

It is to be understood that various changes and modification can be made to the structure and/or to the method without departing from the essence of the invention. For example, other voltage multipliers of the type described are known in which the capacitors in each of the two groups are connected in a parallel instead of a series circuit configuration. This is readily accommondated by an appropriate change in the arrangements of the metal foil strip electrodes. Also, diode D1 is omitted in some known circuits. Another known circuit has the connections to $D_1$ and $C_3$ brought out as separate leads rather than a common lead.

It is also to be understood that other multiplier multiplication factors can be made using the method of the invention, e.g., ×2(Doubles), ×4(Quadruples), and so on.

What is claimed is:

1. A voltage multiplier comprising a plurality of series-connected diodes and a plurality of capacitors coupled to the diodes, the capacitors being arranged in two separate capacitor winding rolls; wherein the rolls are arranged side-by-side with their axes coaxially aligned, the diodes comprising wire lead means serving as lead-out wires from the capacitor electrodes to the respective diodes; whereby the need for extra connections intermediate the electrodes and the diodes is eliminated.

2. A voltage multiplier as claimed in claim 1 wherein the two winding rolls are arranged on a common former.

3. A voltage multiplier as claimed in claim 1 wherein the dielectric material used for the capacitor rolls comprises at least one polystyrene film and at least one polyester film.

4. A voltage multiplier as claimed in claim 1, further comprising an epoxy resin encapsulation material.

5. A method of manufacturing a voltage multiplier of the type comprising a plurality of series-connected diodes and a plurality of capacitors connected to the diodes; the method comprising the steps of winding the capacitors in two separate winding rolls side by side on a common axis, and at appropriate respective stages in the winding process eliminating the need for connections intermediate the electrodes and the diodes by arranging each diode in turn so that each of its leads contacts a capacitor electrode in a respective one of the two winding rolls.

6. A method according to claim 5 wherein the winding of the two capacitor rolls is effected simultaneously.

7. A method according to claim 5, wherein the capacitor dielectric is wound in the form of heat-shrinkable film, the method including the further step of heating the wound assembly to shrink said film.

8. A method according to claim 5, wherein the dielectric material used for the capacitors comprises at least one polyester film and at least one polystyrene film.

* * * * *